(12) United States Patent
Yada

(10) Patent No.: US 6,240,238 B1
(45) Date of Patent: May 29, 2001

(54) MAGNETIC DISK DEVICE

(75) Inventor: Hiroaki Yada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/388,940

(22) Filed: Sep. 2, 1999

(30) Foreign Application Priority Data

Sep. 9, 1998 (JP) .................................................. 10-254832

(51) Int. Cl.[7] ..................................................... H04N 5/91

(52) U.S. Cl. .......................... 386/78; 386/125; 360/77.02; 360/77.08

(58) Field of Search .................................. 386/45, 69–70, 386/125–126, 78–80, 96, 101; 360/50, 48, 135, 77.08, 77.02; 369/44.36

(56) References Cited

U.S. PATENT DOCUMENTS

| 5,541,783 | * | 7/1996 | Yamamoto et al. | 360/48 |
| 5,828,536 | * | 10/1998 | Morita | 360/135 |
| 5,982,728 | * | 11/1999 | Okamoto et al. | 360/50 |
| 5,999,697 | * | 12/1999 | Murase et al. | 386/101 |
| 6,009,054 | * | 12/1999 | Kadowaki et al. | 369/44.36 |

OTHER PUBLICATIONS

IEEE Transactions on Magentics, vol. 32, No. 3, pp. 1799–1804; K.K. Chew, "Control System Challenges to High Track Density Magnetic Storage".

* cited by examiner

Primary Examiner—Wendy R. Garber
Assistant Examiner—Christopher Onuaku
(74) Attorney, Agent, or Firm—Ronald P. Kananen; Rader, Fishman & Grauer

(57) ABSTRACT

A magnetic disk device that has a sufficient tracking control capability and a sufficient capability, and has the rotational speed of a magnetic disk reduced to record moving-image information. A magnetic disk device accesses a magnetic disk with a magnetic head by effecting tracking control of the magnetic disk at predetermined angular intervals, each of the servo areas being formed in synchronism with a clock signal and having a reference pattern for the tracking control. The clock signal is generated by referring to a playback signal from a number of servo areas. Thus, a clock area in one servo can be shortened. The recording density of the magnetic disk is prevented from being reduced even if a number of servo areas area formed on the magnetic disk are effective to prevent the sampling frequency from being lowered. As a result, a sufficient tracking control capability and a sufficient recordable density can be achieved, and the speed of the magnetic disk can be reduced to record moving-image information.

9 Claims, 4 Drawing Sheets

MAGNETIC DISK DEVICE

BACKGROUND OF THE INVENTION

The present invention relates to a magnetic disk device for use as a hard disk drive, a removable hard disk drive, or the like, and more particularly to a magnetic disk device capable of generating a common servo clock signal by referring to reproduced signals from a plurality of servo areas thereby to generate a tracking control signal even with short servo areas, so that a number of servo areas can be produced to achieve a sufficient tracking control capability and a sufficient recordable capacity, and the rotational speed of a magnetic disk can be reduced to record moving-image information.

Heretofore, magnetic disk devices exemplified by hard disk drives and removable hard disk drives have been designed for a reduced access time and an increased recording density.

Specifically, the access time is a period of time required for a magnetic head to seek a target track and start recording desired data in or reproducing desired data from the target track. With the magnetic disk devices of the type described above, the access time is expressed as the sum of a seek time for the magnetic head and a rotational delay time (on the average, ½ of the time required for the magnetic disk to make one revolution).

In the hard disk drives, the magnetic disk is rotated at a constant angular velocity (CAV) so that the rotational speed of the magnetic disk can be kept constant even when the magnetic head is actuated to seek a target track for thereby effectively avoiding an increase in the access time. In addition to the rotation of the magnetic disk at a constant angular velocity, the hard disk drives rotate the magnetic disk at a high speed for further reducing the access time.

To increase the recording density of magnetic disks, a linear recording density in the longitudinal direction of tracks is increased, and the track density is increased to increase an area recording density. Recent years have seen magnetic disks having an area recording density in excess of 3 Gbit/inch$^2$.

If the rotational speed of a magnetic disk is increased and the recording density thereof is increased, then the data transfer rate of the hard disk drive is increased. Specifically, in a 3.5-inch hard disk drive having a linear recording density in excess of 200 kbit/inch, the rotational speed of the disk is about 5400 rpm, and the maximum data transfer rate is higher than 170 Mbit/sec.

In recent years, some hard disk drives are designed to record image data. According to the MPEG (Moving Picture Experts Group) 2 standards, moving images of sufficient quality can be displayed if the image data recorded by hard disk drives are transferred at an average data transfer rate ranging from 4 to 8 Mbit/sec.

Consequently, the conventional hard disk drives have an unnecessary high data transfer rate for recording and reproducing moving-image data.

As described above, the data transfer rate depends on the rotational speed of the magnetic disk. If the unnecessary high data transfer rate is reduced to lower the rotational speed of the magnetic disk, then the power consumption and noise of the hard disk drives can advantageously be reduced.

If the rotational speed of the magnetic disk is lowered, however, the accuracy with which to position the magnetic head is reduced, and the track density is lowered.

Specifically, conventional hard disk drives have servo areas positioned at certain angular intervals on the information recording surface thereof and data areas for recording data which are positioned between the servo areas. There are several tens of servo areas per track, which record positional information required to position the magnetic head, such as head positions, track numbers, etc., and synchronizing patterns necessary for acquiring the positional information.

In each of the servo areas, after a clock signal is synchronized, positional information of the magnetic head is acquired, and tracking control is performed on the magnetic head according to the acquired positional information. The magnetic head is positioned by a servo loop generated in a magnetic head positioning system. The magnetic head positioning servo system determines a closed-loop control frequency band Bsv under various conditions.

The hard disk drives are required to position the magnetic head centrally on tracks irrespective of various disturbances. The disturbances caused within the hard disk drives include periodic and aperiodic components of radial displacements of the shaft of a spindle motor, and positional deviations of the magnetic head due to vibrations of the magnetic disk and vibrations of a head support arm. The disturbances from outside of the hard disk drives include various vibrations and shocks. These disturbances have a frequency spectrum in a low frequency range below 1 [kHz] In order to sufficiently suppress the effect of these disturbances, the closed-loop control frequency band Bsv of the magnetic head positioning servo system needs at least several hundreds [Hz].

Generally, the control frequency band Bsv of a positioning system for a magnetic disk or the like is required to be wider in proportion to the one-half power of the track density TPI according to the following equation (K. K. Chew "Control system challenges to high track density magnetic storage" IEEE Trans. Magn., Vol. 32, No. 3, pp. 1799–1804, May 1996):

$$\text{Bsv} \propto (TPI)^{1/2} \quad (1)$$

Therefore, the control frequency band Bsv of the positioning system for a magnetic disk or the like needs to be as high as the present hard disk drives which have the unnecessary high data transfer rate.

On the other hand, since the servo system of the type described above is a closed-loop sampling control system, its servo sampling frequency fsv needs to be at least 10 times higher than the control frequency band Bsv in order to achieve control loop stability. Stated otherwise, the servo sampling frequency fsv needs to be related to the control frequency band Bsv according to the following equation:

$$fsv > 10 Bsv \quad (2)$$

At present, the servo sampling frequency fsv is set to at least several kHz.

The servo sampling frequency fsv represents the number of servo areas scanned by the magnetic head per unit time, and is expressed by the product of the number Nsv of servo areas along a track on the magnetic disk and the rotational speed R of the magnetic disk, according to the following equation:

$$fsv = Nsv \cdot R \quad (3)$$

From the equations (1) through (3), the following equation (4) is derived. It can be seen from the equation (4) that when the rotational speed R of the magnetic disk is lowered to a level necessary and sufficient to record and reproduce moving-image information, the control frequency band Bsv is also lowered.

$$Nsv \cdot R = 10 Bsv \, (TPI)^{1/2} \qquad (4)$$

If the control frequency band Bsv is lowered, the ability of the magnetic disk device to suppress the effect of various disturbances is lowered, reducing the accuracy with which to position the magnetic head, so that tracks cannot be formed at a high density.

One solution to the above problem would be to increase the number Nsv of servo areas per track on a magnetic disk. On conventional magnetic disks, however, servo areas are relatively long because of the need for resynchronizing the clock signal in each of the servo areas. Therefore, if the number Nsv of servo areas were increased, then the recordable capacity of the magnetic disk would greatly be reduced.

SUMMARY OF THE INVENTION

It is therefore an object of the present invention to provide a magnetic disk device which has a sufficient tracking control capability and a sufficient recordable capacity, and has the rotational speed of a magnetic disk reduced to record moving-image information.

To achieve the above object, there is provided in accordance with the present invention a magnetic disk device for accessing a magnetic disk with a magnetic head by effecting tracking control on the magnetic head based on servo areas positioned on the magnetic disk at predetermined angular intervals, each of the servo areas being formed in synchronism with a clock signal and having a reference pattern for the tracking control, including clock generating means for generating a common clock signal shared by the servo areas, based on a playback signal obtained from the servo areas, tracking control signal generating means for generating a control signal for the tracking control from the reference pattern, based on the clock signal, and tracking control means for effecting the tracking control on the magnetic head based on the control signal, the arrangement being such that areas between the servo areas can be accessed by the magnetic head to record or reproduce image data and audio data.

The clock signal is generated by referring to a playback signal from a number of servo areas. Thus, a clock area in one servo area can be shortened. Similarly, a tracking control signal is also generated from a number of servo areas, so that the servo areas can be shortened. Consequently, the recording density of the magnetic disk is prevented from being reduced even if a number of servo areas are formed on the magnetic disk. Even when the magnetic disk is rotated at a low speed, a number of servo areas formed on the magnetic disk are effective to prevent the sampling frequency from being lowered. As a result, a sufficient tracking control capability and a sufficient recordable capacity can be achieved, and the rotational speed of the magnetic disk can be reduced to record moving-image information.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 2:
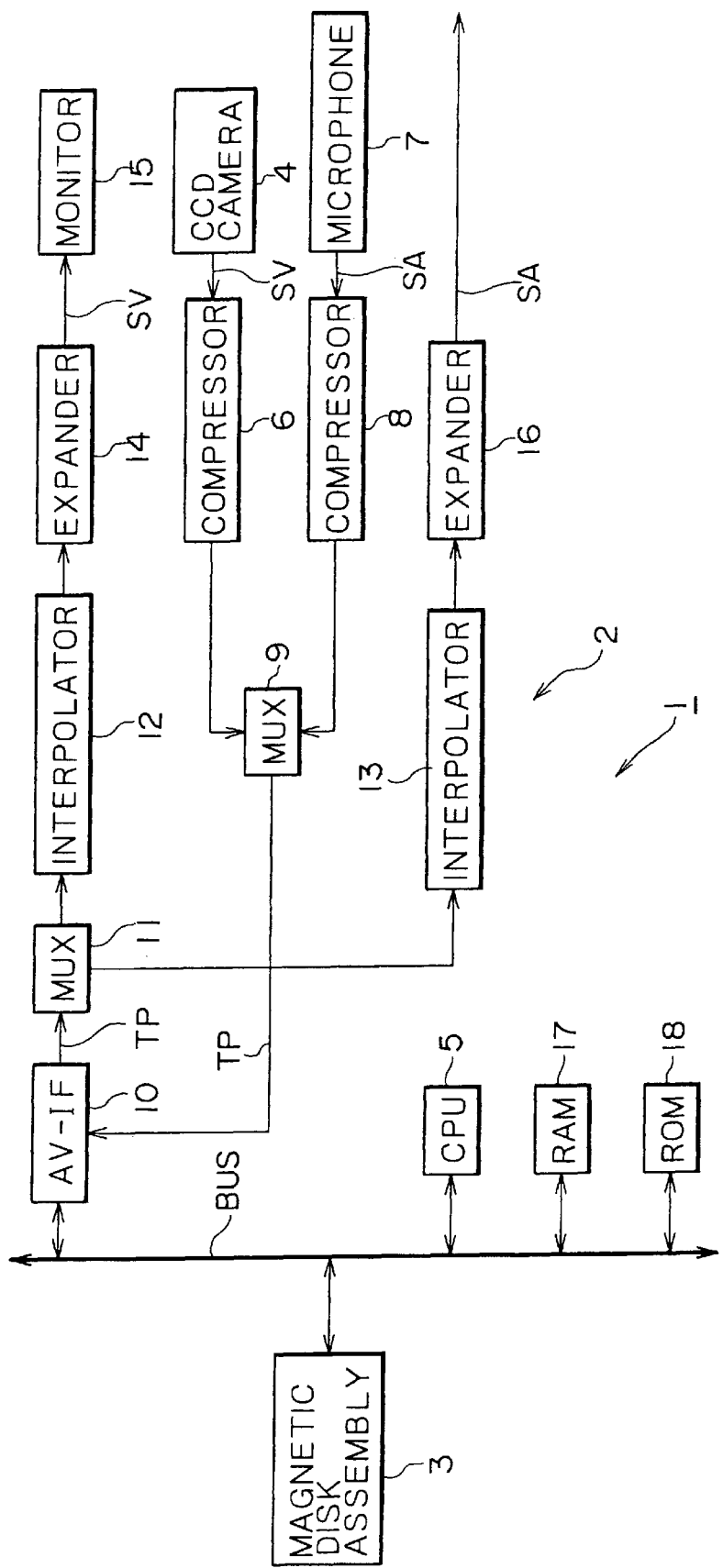
FIG. 2 is a block diagram of the disk camera according to the present invention.

FIG. 2 shows in block form a disk camera 1 according to the present invention.

The disk camera 1 serves to record a moving image or a still image of a subject on a magnetic disk, and to reproduce and output a moving image or a still image recorded on the magnetic disk.

As shown in FIG. 2, the disk camera 1 has a camera assembly 2 for outputting a moving image or a still image of a desired subject, which has been captured, to a magnetic disk assembly 3, and displaying a moving image or a still image reproduced from the magnetic disk assembly 3. In the camera assembly 2, a CCD (charge-coupled device) camera 4 is controlled by a central processing unit (CPU) 5 to output an image of a desired subject as a video signal SV in response to a manual control action of the user of the disk camera 1.

A compressor 6 compresses the data of the video signal SV under the control of the central processing unit 5. If the user selects a moving image processing, then the compressor 6 processes the video signal SV for motion compensation, discrete cosine transform, re-quantization, and two-dimensional Huffman encoding, etc. according to the MPEG 2 format, and outputs the processed data at a data rate which is about ⅕ of the original data rate. If the user selects a still image processing, then the compressor 6 compresses the data of desired frames of the video signal SV according to the JPEG format.

A microphone 7 acquires audio data of the subject and outputs an audio signal SA. A compressor 8 compresses the data of the audio signal SA and outputs the compressed audio data. A multiplexer (MUX) 9 time-division-multiplexes the image data from the compressor 6 and the audio data from the compressor 8 according to the MPEG format into an AV data stream TP composed of the image data and the audio data, and outputs the AV data stream TP. The AV data stream TP has a data transfer rate ranging from 4 to 8 Mbit/sec.

An audio/video interface (AV-IF) 10 outputs the AV data stream TP to a bus BUS when the AV data stream TP is to be recorded, and outputs the AV data stream TP supplied to the bus BUS to a demultiplexer (MUX) 11 when the AV data stream TP is to be played back.

When the AV data stream TP is to be played back, the demultiplexer 11 demultiplexes the AV data stream TP into image data and audio data, and outputs the image data to an interpolator 12 and the audio data to an interpolator 13. The interpolator 12 interpolates the image data from the demultiplexer 11 if necessary, and an expander 14 expands the image data from the interpolator 12 and outputs a video signal SV to a monitor 15, which displays an image based on the video signal SV. In the camera assembly 2, therefore, when an image captured by the CCD camera 4 is to be recorded, the image data is compressed and sent to the bus BUS, and when a captured image is to be played back, the image data supplied to the bus BUS is expanded and displayed on the monitor 15.

The interpolator 13 interpolates the audio data from the demultiplexer 11 if necessary, and an expander 16 expands the audio data from the interpolator 13 and outputs an audio signal SA to an external audio circuit. In the camera assembly 2, therefore, when audio data is to be recorded, the audio signal SA and the video signal SV are multiplexed and sent to the bus BUS, and when audio data is to be played back, the audio data supplied to the bus BUS is expanded and outputted to the external audio circuit.

The central processing unit 5 executes a processing sequence read from a read-only memory (ROM) 18 into a work area in a random-access memory (RAM) 17, so that the central processing unit 5 operates as a controller for controlling operation of the camera assembly 2. When audio and video data are to be recorded, the central processing unit 5 responds to a manual control action of the user to temporarily store an AV data stream TP supplied from the audio/video interface 10 to the bus BUS in the random-access memory 17, and outputs the AV data stream TP at predetermined timing to the magnetic disk assembly 3. In this manner, the image data and the audio data which are multiplexed are outputted as a file to the magnetic disk assembly 3 for being recorded thereby. Conversely, when audio and video data are to be reproduced, the audio and video data (multiplexed audio and video data) supplied from the magnetic disk assembly 3 to the bus BUS are temporarily stored in the random-access memory 17, and thereafter outputted via the bus BUS to audio/video interface 10. In this manner, the image data and the audio data which are sent as file data to the bus BUS are outputted as an AV data stream TP to the audio/video interface 10.

Figure 3:
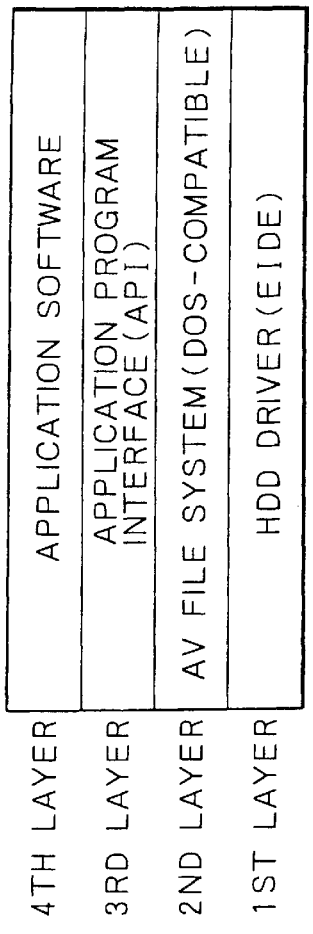
FIG. 3 is a diagram illustrative of a central processing unit of the disk camera shown in FIG. 2.

FIG. 3 shows a software system of a processing sequence executed by the central processing unit 5. In the illustrated embodiment, the software system incorporates a DOS-compatible file system. As shown in FIG. 3, the software system has a first layer comprising a HDD driver such as an extended IDE standard (ATA standard) driver, for example, and a second layer comprising an AV file system which is middleware as a peripheral of the central processing unit 5 for recording an AV data stream TP as a file in the magnetic disk assembly 3. The AV file system comprises a DOS-compatible file system. The software system also has a third layer comprising an application program interface (API) with the second layer for easily describing application software of a fourth layer. The application program interface defines the recording of files, the reading of files, etc. as a group of functions in the C language of ANSI.

The random-access memory 17 provides a work area for the central processing unit 5, and also provides a buffer memory for AV data streams TP. The read-only memory 18 stores the processing sequence for the central processing unit 5.

Figure 4:
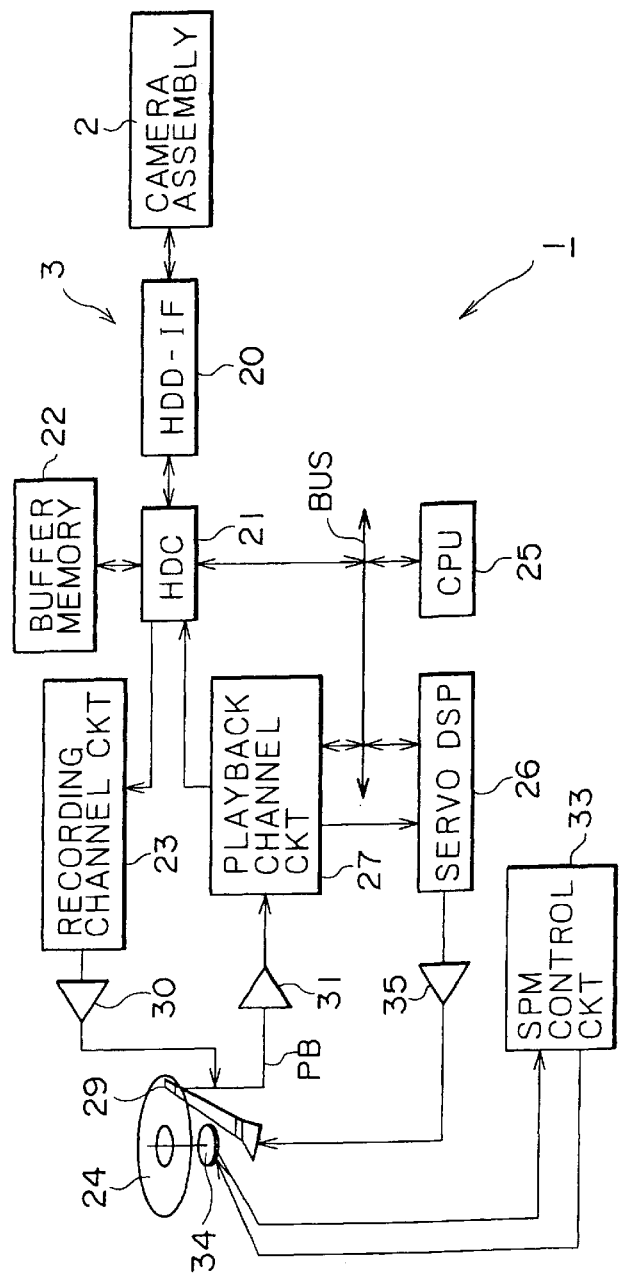
FIG. 4 is a block diagram of a magnetic disk assembly of the disk camera shown in FIG. 2.

As shown in FIG. 4, the magnetic disk assembly 3 serves to record AV data outputted from the camera assembly 2, and to reproduce and output AV data to the camera assembly 2.

The magnetic disk assembly 3 includes a hard disk interface (HDD-IF) 20 according to the extended IDE standard (ATA standard), for outputting AV data outputted as a file from the camera assembly 2 to a hard disk controller (HDC) 21 when the AV data is to be recorded, and outputted AV data outputted as a file from the hard disk controller 21 to the camera assembly 2 when the AV data is to be played back.

When AV data is to be recorded, the hard disk controller 21 temporarily stores the AV data supplied from the hard disk interface 20 in a buffer memory 22, thereafter reads blocks of the stored AV data (e.g., units of 512 bytes) from the buffer memory 22, and outputs the read blocks to a recording channel circuit 23. At this time, the hard disk controller 21 adds a preamble pattern (to be used for bit synchronization upon playback), an error-correcting code, etc. to each of the blocks of data, thus forming packets, and outputs the packets in synchronism with the rotation of a magnetic disk 24 to the recording channel circuit 23. Furthermore, by way of data communication with a central processing unit (CPU) 25, the hard disk controller 21 converts logical block addresses of the AV data outputted as files from the camera assembly 2 into physical addresses (disk surface numbers, track numbers, sector numbers, etc.) of the magnetic disk 24, and sends the physical addresses to a servo DSP 26.

When AV data is to be played back, the hard disk controller 21 sends a control command outputted from the camera assembly 2 to the central processing unit 25 for thereby detecting a corresponding physical address of the magnetic disk 24. The hard disk controller 21 sends the physical address thus detected to the servo DSP 26, and is supplied with AV data reproduced from the physical address of the magnetic disk 24 from a playback channel circuit 27. The hard disk controller 21 temporarily stores the AV data in the buffer memory 22, and thereafter outputs the AV data as a file via the hard disk interface 20 to the camera assembly 2. At this time, the hard disk controller 21 corrects errors contained in the AV data according to the error-correcting code which has been added on recording of AV data, and effects a retry process, if necessary.

The buffer memory 22 thus serves as a buffer for temporarily storing data to be recorded and played back.

When AV data is to be recorded, the recording channel circuit 23 channel-encodes each of the packets outputted from the hard disk controller 21 thereby to convert the data of the packets into a train of binary data matching the characteristics of a magnetic recording channel which comprises the magnetic disk 24 and a magnetic head 29, and outputs the train of binary data. A recording amplifier 30 energizes the magnetic head 29 according to the train of binary data outputted from the recording channel circuit 23, for thereby producing successive magnetized inverted patterns on the magnetic disk 24 depending on the data to be recorded. In this fashion, the magnetic disk assembly 3 records the data outputted from the camera assembly 2 on the magnetic disk 24.

A playback amplifier 31 amplifies a playback signal PB produced by the magnetic head 29 with a predetermined gain and outputs the amplified playback signal PB. The playback channel circuit 27 reproduces a clock signal from the playback signal PB outputted from the playback amplifier 31, and identifies binary data of the playback signal PB based on the clock signal as a reference thereby to reproduce a train of binary data. The playback channel circuit 27 outputs packets of the train of binary data thus reproduced to the hard disk controller 21.

A spindle motor (SPM) control circuit 33 energizes a spindle motor 34 to rotate at a constant angular velocity. In this embodiment, the spindle motor control circuit 33 energizes the spindle motor 34 to rotate the magnetic disk 24 at a rotational speed R of 1800 rpm (30 Hz).

The playback channel circuit 27 processes the playback signal PB to detect the position of the magnetic head 29.

Based on the detected position, the servo DSP 26 generates a drive signal to place the magnetic head 29 right on a desired track, and outputs the drive signal to a drive amplifier 35. The playback channel circuit 27 also detects a track number on the magnetic disk 24 from the playback signal PB. The servo DSP 26 generates a drive signal such that the detected track number will agree with a logical address indicated by the hard disk controller 21, and outputs the drive signal to the drive amplifier 35, which drives the magnetic head 29 to access a desired track.

Figure 1A:
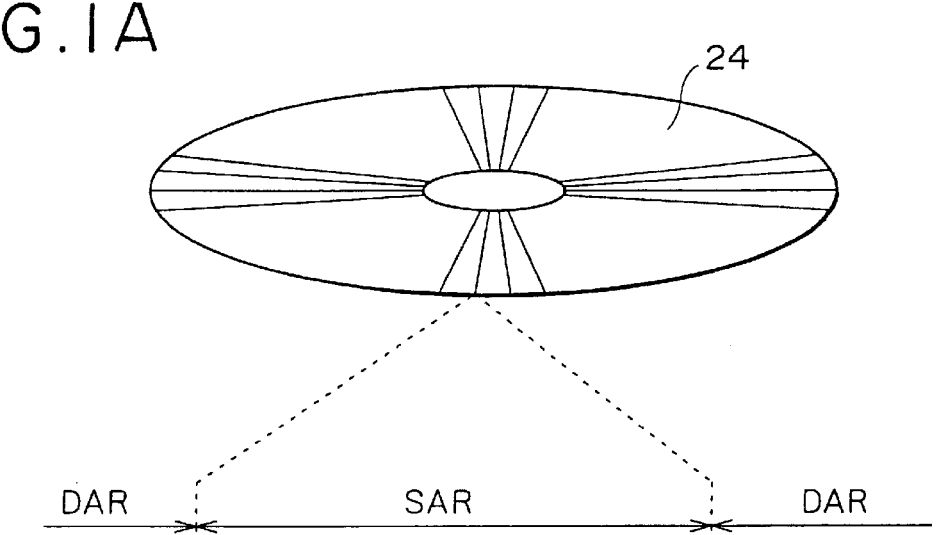
FIGS. 1A and 1B are diagrams showing a magnetic disk that can be used in a disk camera according to the present invention.
Figure 1B:
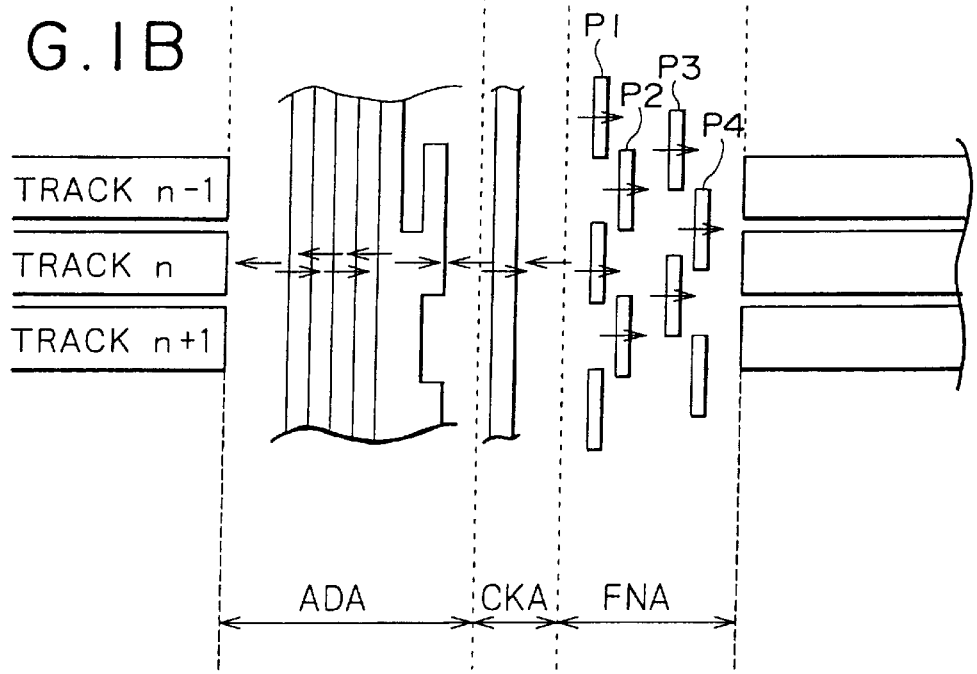

FIGS. 1A and 1B show an arrangement of the magnetic disk 24. In FIG. 1B, arrows indicate directions in which the information recording surface of the magnetic disk 24 is magnetized.

In the illustrated embodiment, the magnetic disk 24 has servo areas SAR spaced at predetermined angular intervals and data areas DAR for recording AV data which are positioned between the servo areas SAR.

These servo areas SAR are generated in synchronism with a certain clock signal. Therefore, when the magnetic disk 24 is rotated at a constant angular velocity, information for tracking control, etc. can be obtained from the magnetic disk 24 without achieving clock signal synchronization with each of the servo areas SAR. The servo areas SAR thus allow sufficient tracking control information, etc. to be obtained even if they have a length smaller than with conventional magnetic disks. In this embodiment, the servo areas SAR have a length sufficiently shorter than those on conventional magnetic disks in view of the above features. For example, one track contains 200 servo areas, so that the magnetic disk 24 is effective to prevent a reduction in the recording density and can maintain sufficient control characteristics even when the rotational speed is lowered.

Each of the servo areas SAR has an address area ADA with a track number and a sector number recorded therein, a clock area CKA for clock signal synchronization, and a tracking area FNA for tracking control, these areas being successively arranged from a position where the magnetic head 29 starts scanning the servo area.

The address area ADA comprises successive magnetized patterns each corresponding to one period of the clock signal which serves as a reference for generating the servo areas SAR. The track number and the sector number are recorded by the magnetic patterns according to the Gray code. The clock area CKA comprises a magnetized pattern corresponding to one period of the clock signal and extending radially of the magnetic disk 24. When AV data is to be played back, the clock signal can be synchronized based on this magnetized pattern as a reference.

The tracking area FNA comprises successive magnetized patterns at respective positions, each corresponding to one period of the clock signal. Specifically, the tracking area FNA comprises a magnetized pattern P2 or P1 positioned on the center of the track, and a magnetized pattern P1 or P2 that is displaced off-track from the above magnetized pattern P2 or P1 by one track pitch in the radial direction of the magnetic disk 24. The tracking area FNA is capable of deciding whether the track is even-numbered or odd-numbered, based on the level of the playback signal PB obtained from the pair of magnetized patterns P1 or P2.

The tracking area FNA also has a set of magnetized patterns P3 or P4 displaced off-track from the center of the track by a ½ track pitch in the radial direction of the magnetic disk 24. The tracking area FNA is capable of detecting the extent of a tracking error representing positional information of the magnetic head 29 based on the level difference between the playback signals PB obtained from the set of magnetized patterns P3 or P4.

Figure 5:
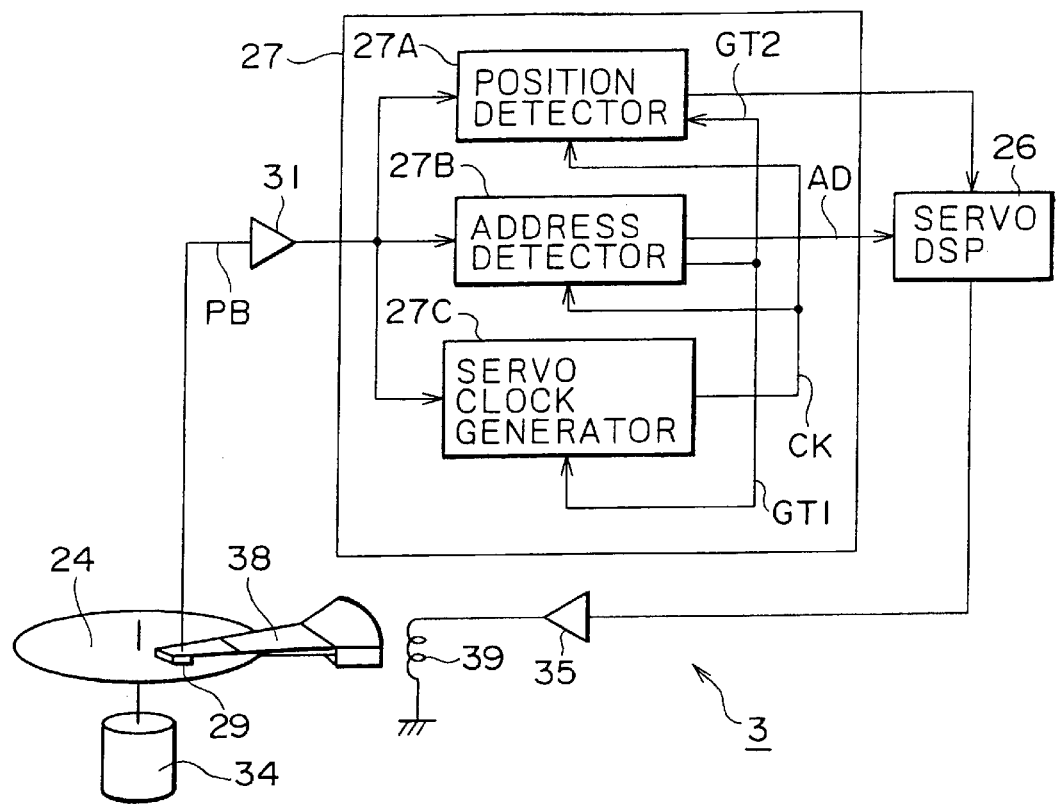
FIG. 5 is a block diagram of a head positioning servo system in the magnetic disk assembly shown in FIG. 4.

FIG. 5 shows in block form a head positioning servo system in the magnetic disk assembly. In the head positioning servo system shown in FIG. 5, a playback signal PB outputted from the magnetic head 29 via the playback amplifier 31 is supplied to a position detector 27A, an address detector 27B, and a servo clock generator 27C in the playback channel circuit 27.

The servo clock generator 27C reads the playback signal PB at the time the magnetic head 29 scans the clock area CKA, based on a gate signal GT1 outputted from the address detector 27B, and reproduces a servo clock signal CK based on the read playback signal PB as a reference. Since the servo areas on the magnetic disk 24 are generated in synchronism with a certain clock signal, the servo clock generator 27C can generate a highly accurate servo clock signal CK based on the magnetized pattern in the clock area CKA as a reference.

The address detector 27B identifies binary data of the playback signal PB based on the servo clock signal CK as a reference thereby to detect an address AD represented by a track number and a sector number from the address area ADA, and outputs the address AD, together with a surface number of the magnetic disk 24, to the servo DSP 26. Moreover, the address detector 27B generates a gate signal GT1 whose signal level is high during a period in which the magnetic head 29 scans the clock area CKA, based on time measurement with the servo clock signal CK based on the timing to detect the address AD as a reference, and outputs the gate signal GT1 to the servo clock generator 27C. Similarly, the address detector 27B generates a gate signal GT2 whose signal level is high during a period in which the magnetic head 29 scans the tracking area FNA, and outputs the gate signal GT2 to the position detector 27A.

The position detector 27A detects the signal level of the playback signal PB based on the gate signal GT2 and the servo clock signal CK as a reference, for thereby detecting the signal level of the playback signal PB obtained from the four magnetized patterns P1 through P4 assigned to each track in the tracking area FNA. From the signal level thus detected, the position detector 27A detects the level differences between the corresponding magnetized patterns P1, P2 and P3, P4 for thereby generating two position signals whose signal levels vary depending on the amount of detracking and whose phases are different with respect to the amount of detracking.

The servo DSP 26 compares an address represented by the address AD and the surface number which are detected by the address detector 27B with the physical address supplied from the hard disk controller 21, and outputs a drive signal, if necessary, based on the result of comparison to the drive amplifier 35 for thereby actuating the magnetic head 29 to seek a sector indicated by the hard disk controller 21. The servo DSP 26 also generates a drive signal for tracking control from the two position signals outputted from the position detector 27A, and outputs the drive signal to the drive amplifier 35 to effect tracking control on the magnetic head 29.

The magnetic head 29 is supported on a tip end of an arm 38 that is angularly movable about a predetermined shaft. The arm 38 can be actuated by a voice coil motor as an electromagnetic actuator. The drive amplifier 35 energizes a coil 39 of the voice coil motor with the drive signal outputted from the servo DSP 26.

Operation of the disk camera 1 will be described below.

While the magnetic disk 24 (see FIG. 5) is being rotated by the spindle motor 34 at a speed of 1800 rpm (30 Hz), the magnetic head 29 detects a playback signal PB from the magnetic disk 24. After the playback signal PB is amplified by the playback amplifier 31, the playback signal PB is processed by the playback channel circuit 27 to detect positional information, etc. of the magnetic head 29.

On the magnetic disk 24 (see FIG. 1), one track contains 200 servo areas. With the rotational speed R=1800 rpm (30 Hz) and the number Nsv of servo area=200 being put in the equation (3), the servo sampling frequency fsv is fsv=6 kHz, and the control frequency band Bsv for suppressing disturbances can be of about 600 Hz according to the equation (2). Therefore, even when the magnetic disk 24 is rotated at a low speed of 1800 [rpm] in the disk camera 1, the disk camera 1 can provide substantially the same tracking control capability as the conventional tracking control capability.

If the servo sampling frequency fsv=6 kHz is to be achieved by conventional hard disk drives, then with the number Nsv of servo area=60, the rotational speed of the magnetic disk has to be increased up to 6000 rpm (100 Hz). With the servo areas SAR being thus formed in synchronism with a predetermined clock signal, the rotational speed of the magnetic disk can be lowered to ⅓ or less while maintaining the same control frequency band.

The servo clock signal is generated at all times by referring to the playback signal PB from the plurality of servo areas SAR. Therefore, information required for tracking control can be acquired without having to achieve servo clock synchronization in each of the servo areas SAR, so that the servo areas SAR can be made shorter than on conventional disks. The magnetic disk can thus provide substantially the same recording capacity as the conventional disks even if the number Nsv of servo areas per track is increased as compared with the conventional disks.

In the disk camera 1 (see FIG. 5), a playback signal PB outputted from the magnetic head 29 is amplified with a predetermined gain by the playback amplifier 31, and then supplied to the servo clock generator 27C, which generates a servo clock signal CK based on the magnetized patterns in the clock area CKA as a reference. Based on the generated servo clock signal CK as a reference, the address detector 27B identifies binary data of the playback signal PB for thereby reproducing an address AD represented by a track number and a sector number from the address area ADA. Similarly, the playback signal PB based on the servo clock signal CK as a reference is processed to generate a control signal for tracking control based on the magnetized patterns P1 through P4 recorded in the tracking area FNA as a reference. In the disk camera 1, a desired track is accessed according to the address thus detected, and tracking control is performed based on the control signal for tracking control.

After the tracking control is performed and a desired track is accessed by the magnetic head 29, the data of a moving image or a still image captured by the CCD camera 4 (see FIG. 2) is compressed, and similarly the data of an audio signal picked up by the microphone 7 is compressed. The image data and the audio data which have been compressed are time-division-multiplexed by the multiplexer 9, generating an AV data stream TP. The AV data stream TP is supplied as a file via the random-access memory 17 to the magnetic disk assembly 3.

In the magnetic disk assembly 3 (see FIG. 4), the supplied AV data stream TP is converted in units of data into AV data having a sector structure via the buffer memory 22. The AV data having the sector structure is converted by the recording channel circuit 23 into a drive signal for the magnetic head 29. The drive signal now actuates the magnetic head 29 to record the AV data on the magnetic disk 24.

When AV data is to be played back, a playback signal PB produced by the magnetic head 29 is processed by the playback channel circuit 27 into playback data, which is processed for error correction, etc. by the hard disk controller 21, reproducing AV data that is stored in the buffer memory 22. The AV data is outputted as a file to the camera assembly 2 (see FIG. 2), and separated into image data and audio data by the demultiplexer 11. The image data is interpolated by the interpolator 12 and expanded by the expander 14 to reproduce an original moving image or still image, which is displayed on the monitor 15. The audio data is interpolated by the interpolator 13, expanded by the expander 16, and outputted to the external audio circuit. In this manner, image data and audio data are reproduced from the magnetic disk 24.

When image data, etc. is recorded and played back, the image data is compressed according to MPEG 2, so that the AV data stream TP has an average data transfer rate ranging from 4 to 8 Mbit/sec.

Since the magnetic disk 24 is rotated at a low speed of 1800 rpm in the disk camera 1, a sufficient time margin is provided for the magnetic head 29 to seek a desired track, making it possible to record an AV data stream TP on and reproduce an AV data stream TP from the magnetic disk 24 at a data transfer rate corresponding to the average data transfer rate ranging from 4 to 8 Mbit/sec for the AV data stream TP.

Figure 6:
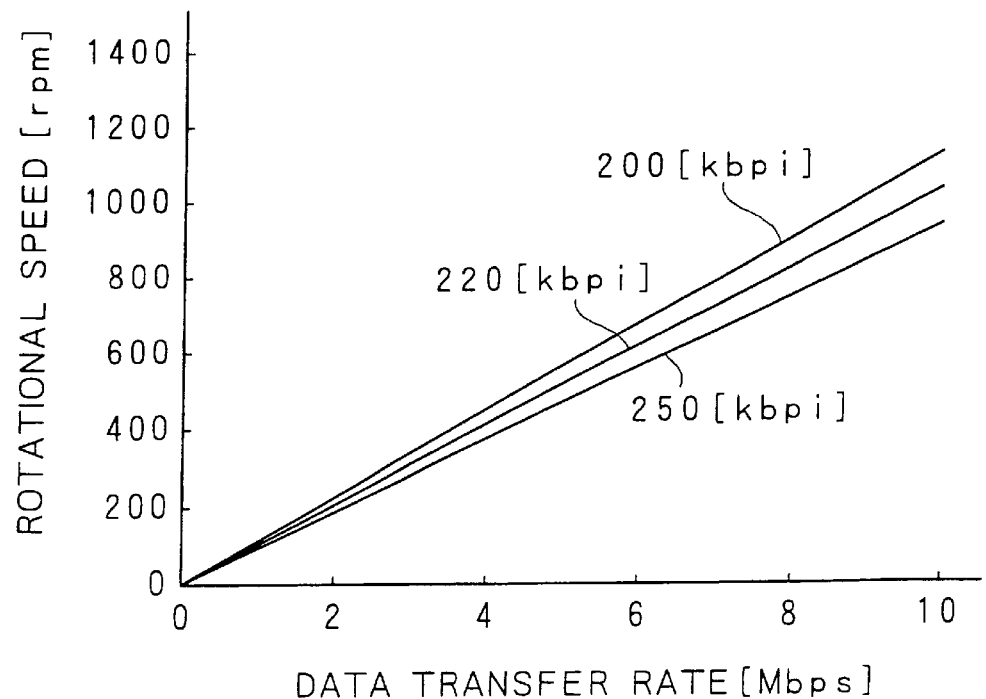
FIG. 6 is a graph of characteristic curves showing the relationship between data transfer rates and rotational speeds of the magnetic disk.

FIG. 6 is a graph of characteristic curves showing the relationship between data transfer rates and rotational speeds of the magnetic disk. In FIG. 6, the characteristic curves are plotted with respect to linear recording densities of 200 kbpi, 220 kbpi, 250 kbpi for a 2.5-inch magnetic disk. It is assumed that the magnetic head 29 has a general seek time of 2 msec. It can be seen from FIG. 6 that the rotational speed of the magnetic disk 24 may be in the range from 400 to 900 rpm in order to achieve the average data transfer rate ranging from 4 to 8 Mbit/sec. In FIG. 6, the data is modulated according to 8/9 coding, and no retry process is effected.

Consequently, the disk camera 1 is capable of reducing the consumption of electric power required to rotate the magnetic disk 24. Incidentally, in the disk camera 1, the spindle motor consumes about one-third of the entire amount of consumed electric power, and the electric power consumed by the spindle motor is expressed as a linear function of the rotational speed (see M. Sri-Jayantha, H. Tokumitsu, A. Aoyagi, "HDA Configuration for Minimum Idle Mode Power by Optimum Read/Write Head Position", IBM Technical Disclosure Bulletin, Vol. 36, No. 06A, pp. 181–184, June 1993). Therefore, the power consumption required to rotate the magnetic disk 24 can greatly be reduced by lowering the rotational speed of the magnetic disk 24 to one-third.

With the power consumption required to rotate the magnetic disk 24 being greatly reduced, the electric power consumed by the recording channel circuit 23, the playback channel circuit 27 and the hard disk controller 21 can also be reduced, resulting in a reduction in the entire power consumption of the disk camera 1. Since the recording channel circuit 23, the playback channel circuit 27, and the hard disk controller 21 comprise CMOS logic circuits for continuously processing data at a rate of several tens Mbit/sec or greater, their power consumption varies depending on their operating frequency.

As the rotational speed of the magnetic disk 24 is lowered, the noise produced thereby when it rotates is lowered. Thus, when an audio signal is recorded, the amount of background noise can be reduced, making it possible to record sounds at a good S/N ratio. Moreover, the disk camera 1 itself is made silent.

In the disk camera 1, a clock signal is generated by referring to a playback signal from a plurality of servo areas. Therefore, the clock signal can be generated with short servo areas to generate a control signal for tracking control. Thus, a number of servo areas can be formed to achieve a sufficient tracking control capability and a sufficient recordable capacity, and the rotational speed of a magnetic disk can be reduced to record moving-image information.

In the above embodiment, servo areas are composed of magnetized patterns. However, various processes of forming servo areas are applicable to the present invention. For example, a magnetic film may partially be removed as by etching to form a patterned shape, and thereafter a remaining magnetic film may be magnetized in one direction by a direct current with a magnetic head to form servo areas. Alternatively, a concavity and a convexity may be formed on the surface of a disk substrate according to a pattern, and thereafter may be magnetized to opposite polarities to form servo areas.

In the above embodiment, the present invention is applied to a hard disk drive. However, the principles of the present invention are also applicable to various magnetic disk devices such as removable hard disk drives where the magnetic disk can be replaced.

In the above embodiment, image data is compressed according to MPEG 2 or JPEG. However, various data compression processes such as DV are also applicable to the present invention.

With the arrangement of the present invention, as described above, a common clock signal is generated by referring to reproduced signals from a plurality of servo areas thereby to generate a tracking control signal even with short servo areas, so that a number of servo areas can be produced to achieve a sufficient tracking control capability and a sufficient recordable capacity, and the rotational speed of a magnetic disk can be reduced to record moving-image information.

Although certain preferred embodiments of the present invention have been shown and described in detail, it should be understood that various changes and modifications may be made therein without departing from the scope of the appended claims.

What is claimed is:

1. A magnetic disk device for accessing a magnetic disk with a magnetic head by effecting tracking control on the magnetic head based in servo areas positioned on the magnetic disk at predetermined angular intervals, each of the servo areas being formed in synchronism with a clock signal and having a reference pattern for the tracking control, said magnetic disk device comprising:

clock generating means for generating a common clock signal shared by the servo areas, based on a playback signal obtained from the servo areas;

tracking control signal generating means for generating a control signal for the tracking control from said reference pattern, based on said clock signal; and tracking control means for effecting the tracking control of the magnetic head based on said control signal;

the arrangement being such that areas between said servo areas can be accessed by said magnetic head to record or reproduce image data and audio data;

wherein said clock generating means reads said playback signal outputted from the magnetic head based on a gate signal outputted from address detector, and reproduces a servo clock signal based on said playback signal.

2. A magnetic disk device according to claim 1, further comprising:

image data generating means for acquiring said image data.

3. A magnetic disk device according to claim 2, wherein said image data generating means comprises:

imaging means for capturing an image of a subject and outputting the captured image; and data compressing means for compressing data of the captured image into said image data.

4. A magnetic disk device according to claim 2, further comprising:

data compressing means for compressing data of an audio signal into said audio data.

5. A magnetic disk device according to claim 1, wherein said magnetic disk is replaceable retained.

6. A magnetic disk device according to claim 1, wherein said magnetic disk is rotatable at a speed of at most 2000 [[rpm]].

7. A magnetic disk device according to claim 1, wherein said playback signal originates from a plurality of servo areas, and where said servo clock signal is generated at all times by referring to said playback signal.

8. A magnetic disk device according to claim 7, wherein said servo areas are formed in synchronism with a predetermined servo clock signal.

9. A magnetic disk device according to claim 7, wherein said servo clock signal is generated at all times by referring to said read playback signal.

* * * * *

UNITED STATES PATENT AND TRADEMARK OFFICE
CERTIFICATE OF CORRECTION

PATENT NO.    : 6,240,238 B1
DATED         : May 29, 2001
INVENTOR(S)   : Hiroaki Yada It is certified that error appears in the above-identified patent and that said Letters Patent is hereby corrected as shown below:

<u>Title page,</u>
The title should read:
-- MAGNETIC DISK DEVICE CAPABLE OF GENERATING A COMMON SERVO SIGNAL --

<u>Column 12,</u>
Line 37, replace "replaceable" with -- replaceably --
Line 40, delete "[[rpm]]".

Signed and Sealed this

Third Day of September, 2002

*Attest:*

JAMES E. ROGAN
*Attesting Officer*        *Director of the United States Patent and Trademark Office*